A. NERAAS.
PISTON.
APPLICATION FILED MAY 29, 1919.
1,362,435.  Patented Dec. 14, 1920.
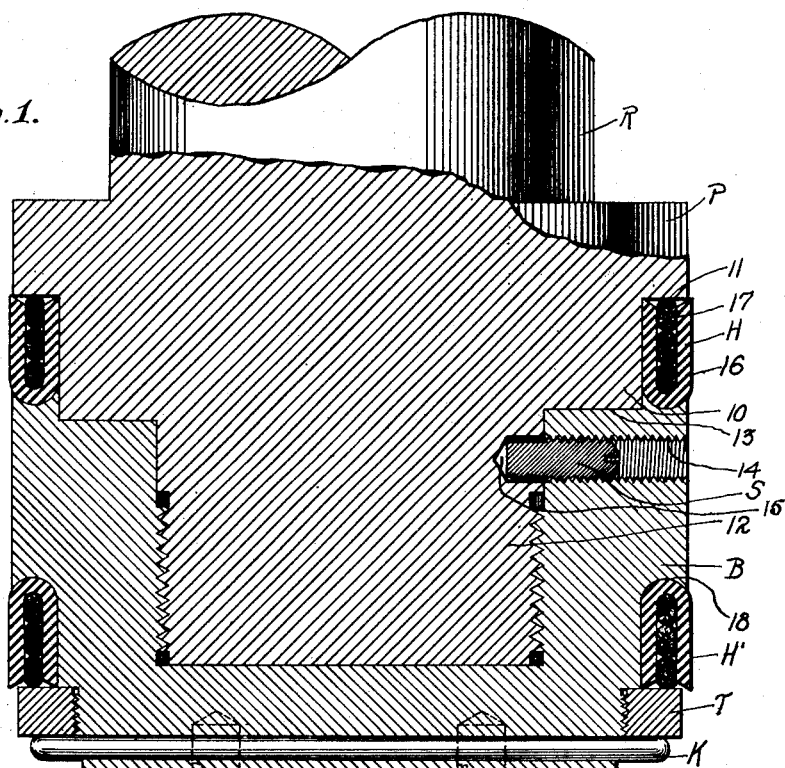
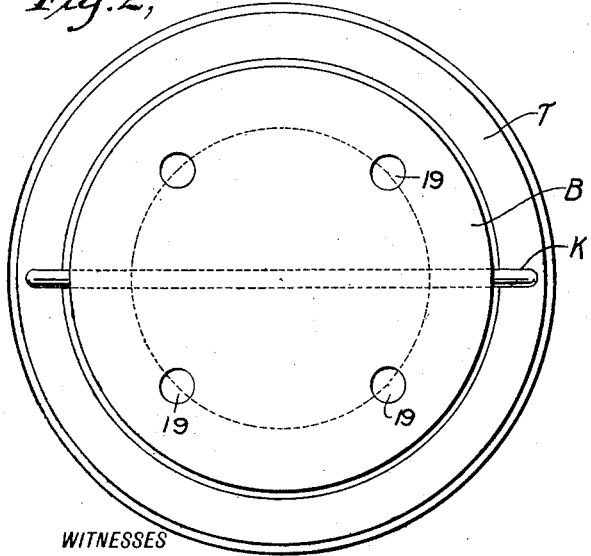
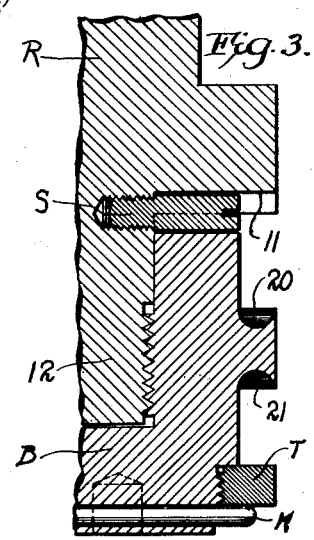
WITNESSES
INVENTOR
A. NERAAS
BY
ATTORNEYS

UNITED STATES PATENT OFFICE.

ANTONE NERAAS, OF PHILADELPHIA, PENNSYLVANIA.

PISTON.

1,362,435.  Specification of Letters Patent.  Patented Dec. 14, 1920.

Application filed May 29, 1919. Serial No. 300,564.

*To all whom it may concern:*

Be it known that I, ANTONE NERAAS, a citizen of Norway, and a resident of Philadelphia, in the county of Philadelphia and State of Pennsylvania, have invented a new and Improved Piston, of which the following is a full, clear, and exact description.

My invention relates to pistons adapted for use in hydraulic presses, and particularly to that class of piston in which the packing bushing is removable from the inner or working side of the piston head for repairing purposes. In pistons of this type the construction has been such that the threaded retaining rings for the bushing provide a passage between the threads of the rings and bushing through which the water seeps, thus causing the piston to leak and rendering it useless. Another disadvantage of such a piston is that the construction necessitates a joint interiorly of the bushing which is in direct communication with the joint of the retaining rings, so that after the water has leaked through the retaining rings it finds its way through the bushing and to the other side of the piston head.

My invention is directed to a particular form of piston with the purpose of overcoming these defects and to this end I provide a bushing which completely covers the working side of the piston head so that the water which seeps through the retaining rings does not gain access to the bushing, thereby maintaining at all times a watertight connection between the body of the piston and the bushing.

I will describe two forms of pistons embodying my invention and will then point out the novel features thereof in claims.

In the accompanying drawings,

Figure 1 is a view showing in vertical section one form of piston embodying my invention.

Fig. 2 is a view showing in plan the working side of the piston shown in Fig. 1; and Fig. 3 is a fragmentary sectional view showing a modified form of piston embodying my invention.

Similar reference characters refer to similar parts in each of the several views.

Referring to the drawings in detail and particularly to Figs. 1 and 2, R designates a piston rod upon which is formed a piston body P having a slightly reduced portion 10 to provide an annular shoulder 11, and a further reduced portion 12 which provides an annular shoulder 13. B designates the brass bushing which as here shown, is of cup-shaped formation. The depth and internal diameter of the bushing B is such that when in position on the piston body P, it snugly receives the portion 12 while its upper edge bears against the shoulder 13, thus completely enveloping the portion 12 and providing no joints which are exposed to the working side of the piston.

As a temporary securing means for the bushing B the confronting faces of the portion 12 and bushing are screw-threaded, as shown in Fig. 1, while to effect a locking of the bushing on the body, I provide a set screw S which works within an opening 14 in the bushing and projects into a recess 15 formed in the portion 12. Under actual working conditions the opening 14 is preferably closed by a wooden plug (not shown).

As shown in Fig. 1, that part of the upper edge of the bushing B which confronts the shoulder 11 is grooved to accommodate and retain between the two a packing ring H. The packing ring comprises, in the present instance, a strip of leather 16 bent longitudinally in the form of a U and having pieces of hemp 17 interposed between the parallel portions of the strip. I also provide a similar packing ring H' adjacent the lower end of the bushing B, and to accommodate this ring, the bushing is reduced in diameter as shown, the shoulder 18 formed by such reduction being grooved to receive the packing ring, as in the shoulder 11. T designates a retaining ring which coöperates with the shoulder 18 to secure the packing ring H' in proper position. This ring T threadedly engages the lower end of the bushing B as shown, and is locked to the bushing by a key K which extends transversely through a suitable opening formed in the bushing.

To facilitate the application and removal of the bushing B after the two locking elements have been removed, I provide its lower or working side with recesses 19 to receive a suitable tool for rotating the bushing, as will be understood.

The form of piston shown in Fig. 3 is identical to the form just described with the following exceptions:

The reduced portion 10 is eliminated and the shoulder 11 extended inwardly to the portion 12, while the upper edge of the bushing B is flat throughout. The working surface of the bushing is also relatively narrow and its upper and lower edges 20 and 21 are grooved in opposite directions, as shown, to accommodate the two packing rings H and H'.

Although I have herein shown and described only two forms of pistons embodying my invention, it is to be understood that various changes and modifications may be made herein without departing from the spirit of the invention and the spirit and scope of the appended claims.

What I claim is:

1. A piston comprising a body having a reduced portion on its working side, a cup-shaped bushing receiving the reduced portion and completely covering the same, a packing ring on the bushing, a ring removably secured to the bushing for retaining the packing ring on the bushing and a key for locking said ring in position.

2. A piston comprising a body formed with a shoulder and a recess, a one-piece cup-shaped bushing threaded on said body, said bushing having a threaded aperture adapted to be brought into alinement with said recess when the bushing is in proper position, a locking screw positioned in said threaded aperture adapted to be moved so that part will project into said recess and thereby lock said bushing into place, and a packing arranged between said bushing and the shoulder on said body.

3. A piston comprising a body formed with an annular shoulder, a cup-shaped bushing threaded on to said body and formed with a projection and an annular groove facing said shoulder, and a packing arranged between said shoulder and said projection, said packing being held in place by said projection.

4. A piston comprising a body formed with an annular shoulder, a bushing threaded on to said body and formed with a projection having oppositely facing annular grooves, one of said grooves facing said shoulder and the other in an opposite direction, a packing arranged between last mentioned groove and said shoulder, a second packing fitting in the other groove, and means for locking the last mentioned packing in place.

5. A piston comprising a body formed with a shoulder, a cap coacting with said shoulder for holding in place a packing, and a packing arranged between said bushing and said shoulder, said packing comprising a strip of leather formed substantially U-shaped in cross section and a hemp lining positioned between the lugs of the U.

ANTONE NERAAS.